Patented Sept. 12, 1950

2,522,311

UNITED STATES PATENT OFFICE 2,522,311

INSECTICIDAL COMPOSITIONS

Herschel G. Smith, Wallingford, Mark L. Hill, Boothwyn, and Troy L. Cantrell, Lansdowne, Pa., assignors to Gulf Oil Corporation, Pittsburgh, Pa., a corporation of Pennsylvania No Drawing. Application May 18, 1948, Serial No. 27,828

18 Claims. (Cl. 167—24)

This invention relates to insecticidal compositions, and more particularly, to insecticidal compositions which are stabilized and benefited by the inclusion therein of certain additives.

The compounding and use of modern insecticidal compositions is complicated by a variety of difficulties which are presented by even the most carefully compounded insecticides. Of these difficulties, one of the most serious is that of deterioration which, of course, is almost inevitably accompanied by a loss of killing power. Many insecticides tend to deteriorate upon aging, and frequently such aging is accompanied by the formation of haziness in the composition followed by precipitation of some of the toxic ingredients or decomposition products thereof. In addition, the deterioration of many insecticides, particularly those comprised of pyrethrins or halogen containing compounds, such as DDT, is noticeably hastened by exposure to the action of light rays and by oxidation.

As desirable as it is to alleviate the above difficulties, it is equally desirable to increase the killing power of the toxicants used in insecticides. This is sometimes accomplished by means of appropriate additives termed synergists. The phenomenon of synergism is well known in the art, and although the exact mechanism to explain the synergistic effects of many compounds is not fully known, the use of synergists is widely practiced.

Accordingly, this invention has as an object the provision of insecticidal compositions of enhanced killing power.

A further object is to provide compositions containing compounds capable of synergizing the killing properties of insecticidal toxicants.

Another object is to provide insecticidal compositions which are stabilized against reduction of killing power due to subjection to light rays.

Another object is to provide compositions of the character described which will have a reduced hazing tendency and reduced tendency toward precipitation of the toxic ingredients.

These and other objects are accomplished by the present invention wherein we provide insecticidal compositions comprising one or more insecticidal toxicants, a solvent therefor, and an azo-methine compound of the following formula:

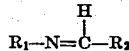

wherein $R_1$ and $R_2$ are aromatic groups. They are preferably made in accordance with the procedure shown in U. S. Patent 2,388,903, patented November 13, 1945, to Cantrell and Peters by condensing a primary aryl amine with an aromatic aldehyde in the presence of a small amount of dicyclohexylamine. Representative azo-methine compounds are furfuralaniline, furfural-xylidine, furfural-p-toluidine, furfural-o-tolidine, furfural benzal-o-tolidine, furfuracrylidene-aniline, benzal-aniline, benzal-xylidines, benzal-betanaphthylamine, benzal-alphanaphthylamine, benzal - o - toluidine, benzal-p-toluidine, benzal-o-anisidine, benzal-p-anisidine, benzal-p-aminoazobenzene, p-dimethylamino-benzal - xylidine, 2-hydroxy-5-methylbenzal-aniline, p-dimethylamino - benzal-p-dimethylaminoaniline, p-dimethylamino-benzal-aniline, dibenzal-p-phenylenediamine, dibenzal-o-tolidine, cinnamylidene-analine, and cinnamylidene-xylidine.

Of these, we have found benzal-aniline having the following formula, to be very effective:

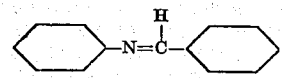

In addition, cinnamylidene-aniline, having the following formula, produces desirable results:

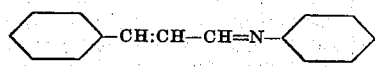

Further, the isomeric benzal-xylidines are useful, particularly benzal-3,5-xylidine, having the following formula:

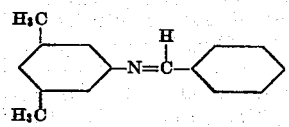

Furthermore, furfural-aniline, having the following formula, is advantageous when used in accordance with our invention:

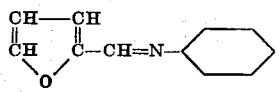

Relatively minor quantities of the compounds of this invention, in stabilizing amounts, such as from 0.01 to 2.0 per cent by weight, may be incorporated in insecticidal compositions with advantageous results, although preferably, amounts of from 0.2 to 1.0 per cent by weight, are used.

It is well known in the art, that when 2,2 bis (parachlorophenyl)-1,1,1-trichloroethane is dissolved in a non-aromatic hydrocarbon, a considerable proportion of the toxicant tends to become insoluble and settle out shortly thereafter.

However, when from 0.2 to 1.0 per cent by weight of cinnamylidene-aniline was added to a solution of 6 per cent by weight of 2,2 bis (parachlorophenyl)-1,1,1,-trichloroethane, in a relatively paraffinic type of hydrocarbon fraction in the kerosene boiling range, there was no indication of settling at the end of a year. The effectiveness of cinnamylidene-aniline, as well as furfural-aniline, benzal-aniline and benzal-3,5-xylidine, in preventing the precipitation or settling out of 2,2-bis (parachlorophenyl) 1,1,1-trichloroethane from a solution in a relatively non-aromatic kerosene is demonstrated by the results shown in Table I.

Table I

| 6% 2,2-bis (parachlorophenyl)-1,1,1-trichloroethane in Kerosene Containing— | Apparent Per Cent Volume settling after— | | |
|---|---|---|---|
| | 30 days | 180 days | 360 days |
| No Additive | 5 | 5 | 5 |
| 0.05% Cinnamylidene-aniline | 2 | 3 | 4 |
| 0.10% Cinnamylidene-aniline | 0 | 0 | trace |
| 0.28% Cinnamylidene-aniline | 0 | 0 | trace |
| 0.50% Cinnamylidene-aniline | 0 | 0 | 0 |
| 0.50% Furfural-aniline | 0 | 0 | 0 |
| 0.50% Benzal-aniline | 0 | 0 | 0 |
| 0.50% Benzal-3,5-xylidine | 0 | 0 | 0 |

The compounds of the present invention are also effective in preventing the precipitation of pyrethrins from solution upon exposure to ultra-violet light. For example, a solution containing 100 mg. pyrethrins per 100 cc. of kerosene and from 0.2 to 0.5 per cent by weight of cinnamylidene-aniline did not settle out when exposed to ultra-violet light for a period of 12 hours.

In addition, the additives described hereinabove are capable of advantageously synergizing the toxic effects of pyrethrins. By way of example, a sample containing 100 mg. of pyrethrins per 100 cc. of solution in a kerosene type petroleum solvent was found to give a kill equal to that of the official test insecticide (National Association of Insecticide and Disinfectant Manufacturers) when tested on the common house fly (Musca domestica). When relatively small quantities of additives of the present invention are introduced into such a solution of pyrethrins, the kill of such insecticides is materially increased, as illustrated by the results in Table II. This table shows the results of tests performed both on solutions of pyrethrins containing our additives, and on kerosene solutions of the additives alone. The fly killing test used herein is set forth in detail in U. S. Patent 2,421,223.

Table II

| Compounds | Per Cent | Relationship of kill of sample to that of Official Test Insecticide in Solution of— | |
|---|---|---|---|
| | | Kerosene | 100 mg. pyrethrins per 100 cc. |
| Furfural-aniline | 0.5 | minus 40 | plus 18. |
| Benzal-aniline | 0.5 | minus 35 | plus 16. |
| Benzal-3,5-xylidine | 0.5 | minus 40 | plus 19. |
| Cinnamylidene-aniline | 0.5 | minus 25 | plus 24. |

The above results clearly indicate that the additives of our invention exert a pronounced synergistic effect on pyrethrins. The additives alone in kerosene exhibited a kill below that of the official test insecticide, and the kill of the pyrethrins solution alone without the additives was equal to that of the official test insecticide.

The kill of many insecticides is often substantially reduced by exposure to ultra-violet light or sunlight. For example, a sample containing 100 mg. of pyrethrins per 100 cc. of solution lost all ability to kill flies after about 6 hours exposure to ultra-violet light. On the other hand, a similar sample of 100 mg. of pyrethrins per 100 cc. solution containing but 0.5 per cent of cinnamylidine-aniline gave a rating of +21 with respect to the official test insecticide after exposure to ultra-violet light for 12 hours. This stabilizing effect of azo-methine compounds against ultra-violet light was further substantiated by testing the kill of an insecticide comprising 60 mg. of pyrethrins per 100 cc. solution, 0.25 per cent 2,2-bis (parachlorophenyl)-1,1,1-trichloroethane and 0.5 per cent benzal-xylidine in a relatively paraffinic hydrocarbon fraction of the kerosene boiling range. The results of these tests both before and after exposure to ultra-violet light are shown in Table III.

Table III

| Difference between kill of Sample and Official Test Insecticide against Musca domestica | |
|---|---|
| When prepared | plus 48. |
| Exposed to Ultra-Violet Light in Quartz Tube: | |
| 12 hr | plus 48. |
| 24 hr | plus 49. |
| 48 hr | plus 48. |
| 63 hr | plus 45. |

The above description and specific examples are intended to be illustrative of the invention only, and many different embodiments may be made without departing from the spirit and scope thereof.

What we claim is:

1. An insecticidal composition comprising a pyrethrin insecticide toxicant, a solvent therefor, and a small but stabilizing amount of an azo-methine compound having the following formula:

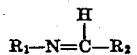

wherein $R_1$ and $R_2$ represent aromatic groups.

2. The composition of claim 1 wherein the azo-methine compound is present in an amount of from 0.10 to 2.0 per cent by weight.

3. An insecticidal composition comprising the toxicant 2,2 bis (parachlorophenyl)-1,1,1-trichloroethane, a solvent therefor, and a small but stabilizing amount of an azo-methine compound having the following formula:

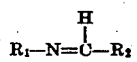

wherein $R_1$ and $R_2$ represent aromatic groups.

4. The composition of claim 3 wherein the azo-methine compound is present in an amount of from 0.10 to 2.0 per cent by weight.

5. An insecticidal composition comprising the toxicants 2,2 bis (parachlorophenyl)-1,1,1-trichloroethane and pyrethrins, a solvent therefor, and a small but stabilizing amount of an azo-methine compound having the following formula:

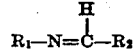

wherein $R_1$ and $R_2$ represent aromatic groups.

6. The composition of claim 5 wherein the azomethine compound is present in an amount of from 0.10 to 2.0 per cent by weight.

7. An insecticidal composition comprising a pyrethrin insecticide toxicant, a solvent therefor, and a small but stabilizing amount of furfural-aniline.

8. An insecticidal composition comprising a pyrethrin insecticide toxicant, a solvent therefor, and a small but stabilizing amount of benzal-3,5-xylidine.

9. An insecticidal composition comprising a pyrethrin insecticide toxicant, a solvent therefor, and a small but stabilizing amount of cinnamylidene-aniline.

10. An insecticidal composition comprising the toxicant 2,2 - bis (parachlorophenyl)-1,1,1-trichloroethane, a solvent therefor, and a small but stabilizing amount of furfural-aniline.

11. An insecticidal composition comprising the toxicant 2,2 - bis (parachlorophenyl)-1,1,1-trichloethane, a solvent therefor, and a small but stabilizing amount of benzal-3,5-xylidine.

12. An insecticidal composition comprising the toxicant 2,2 - bis (parachlorophenyl)-1,1,1-trichloroethane, a solvent therefor, and a small but stabilizing amount of cinnamylidene-aniline.

13. An insecticidal composition comprising the toxicants 2,2 - bis (parachlorophenyl)-1,1,1-trichloroethane and pyrethrins, a solvent therefor, and a small but stabilizing amount of furfural-aniline.

14. An insecticidal composition comprising the toxicants 2,2 - bis (parachlorophenyl)-1,1,1-trichloroethane and pyrethrins, a solvent therefor, and a small but stabilizing amount of benzal-xylidene.

15. An insecticidal composition comprising the toxicants 2,2 - bis (parachlorophenyl)-1,1,1-trichloroethane and pyrethrins, a solvent therefor, and a small but stabilizing amount of cinnamylidene-aniline.

16. An insecticidal composition comprising a pyrethrin insecticide toxicant, a solvent therefor, and a small but stabilizing amount of benzal-aniline.

17. An insecticidal composition comprising the toxicant 2,2-bis(parachlorophenyl)-1,1,1-trichloroethane, a solvent therefor, and a small but stabilizing amount of benzal-aniline.

18. An insecticidal composition comprising the toxicants 2,2 - bis(parachlorophenyl) - 1,1,1-trichloroethane and pyrethrins, a solvent therefor, and a small but stabilizing amount of benzal-aniline.

HERSCHEL G. SMITH.
MARK L. HILL.
TROY L. CANTRELL.

REFERENCES CITED

The following references are of record in the file of this patent:

UNITED STATES PATENTS

| Number | Name | Date |
| --- | --- | --- |
| 2,425,185 | Haury | Aug. 5, 1947 |

OTHER REFERENCES

Swingle et al., J. Econ. Ent., vol. 37, No. 1, Feb. 1944, pages 70–74.

Bushland, J. Econ. Ent., vol. 33, No. 4, pages 669–675, August 1940.

Gersdorff et al., J. Econ. Ent., vol. 37, No. 1, Feb. 1944, page 137.